US008762554B2

(12) United States Patent
Trace et al.

(10) Patent No.: US 8,762,554 B2
(45) Date of Patent: Jun. 24, 2014

(54) SECURE RESOURCE NAME RESOLUTION

(71) Applicant: Microsoft, Redmond, WA (US)

(72) Inventors: Rob M. Trace, Redmond, WA (US); Libby Meren, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/682,238

(22) Filed: Nov. 20, 2012

(65) Prior Publication Data

US 2013/0080649 A1 Mar. 28, 2013

Related U.S. Application Data

(60) Division of application No. 12/979,202, filed on Dec. 27, 2010, now Pat. No. 8,332,487, which is a continuation of application No. 12/189,034, filed on Aug. 8, 2008, now Pat. No. 7,917,616.

(51) Int. Cl.
*G06F 15/16* (2006.01)

(52) U.S. Cl.
USPC .......................................... 709/229; 709/217

(58) Field of Classification Search
USPC .......................... 709/200–203, 217–229, 230
See application file for complete search history.

(56) References Cited

U.S. PATENT DOCUMENTS

| | | | |
|---|---|---|---|
| 5,819,044 A | 10/1998 | Kawabe et al. | |
| 5,878,212 A | 3/1999 | Civanlar et al. | |
| 5,983,270 A | 11/1999 | Abraham | |
| 6,338,082 B1 | 1/2002 | Schneider | |
| 6,502,135 B1 | 12/2002 | Munger et al. | |
| 6,560,634 B1 | 5/2003 | Broadhurst | |
| 6,678,717 B1 | 1/2004 | Schneider | |
| 6,760,746 B1 | 7/2004 | Schneider | |
| 6,961,783 B1 | 11/2005 | Cook et al. | |
| 7,031,297 B1 | 4/2006 | Shabtay | |
| 7,188,180 B2 | 3/2007 | Larson et al. | |

(Continued)

FOREIGN PATENT DOCUMENTS

| | | |
|---|---|---|
| CN | 101087253 | 12/2007 |
| EP | 1855446 | 11/2007 |

(Continued)

OTHER PUBLICATIONS

Chinese 2nd Office Action in Application 200980130777.7, mailed Apr. 16, 2013, 10 pages.

(Continued)

*Primary Examiner* — Moustafa M Meky
(74) *Attorney, Agent, or Firm* — Andrew Sanders; Micky Minhas

(57) ABSTRACT

Techniques for securing name resolution technologies and for ensuring that name resolution technologies can function in modern networks that have a plurality of overlay networks accessible via a single network interface. In accordance with some of the principles described herein, a set of resolution parameters may be implemented by a user, such as an end user or an administrator, to be used during a name resolution process for securing the process and/or for conducting the process in an overlay network. In some implementations, the set of resolution parameters may be maintained as a table of rules, and used to govern name resolution processes. For example, resolution parameters may be created that govern a DNSSEC session, or that govern how to communicate with networks implemented with Microsoft's Direct Access overlay technologies, or that govern communications using any other networking technology.

20 Claims, 11 Drawing Sheets

(56) References Cited

U.S. PATENT DOCUMENTS

| | | | |
|---|---|---|---|
| 7,209,479 | B2 | 4/2007 | Larson |
| 7,296,155 | B1 | 11/2007 | Trostle et al. |
| 7,299,491 | B2 | 11/2007 | Shelest et al. |
| 7,356,767 | B2 | 4/2008 | Dahyabhai et al. |
| 7,373,500 | B2 | 5/2008 | Ramelson |
| 7,415,673 | B2 | 8/2008 | Dahyabhai et al. |
| 7,522,931 | B2 | 4/2009 | Ranalli et al. |
| 7,734,745 | B2 | 6/2010 | Gloe |
| 7,774,592 | B2 | 8/2010 | Ishikawa et al. |
| 7,917,616 | B2 | 3/2011 | Trace et al. |
| 7,970,004 | B2* | 6/2011 | Sayenko .................. 370/447 |
| 8,332,487 | B2 | 12/2012 | Trace et al. |
| 8,429,715 | B2 | 4/2013 | Meren et al. |
| 2002/0133608 | A1 | 9/2002 | Godwin et al. |
| 2003/0163722 | A1 | 8/2003 | Anderson |
| 2004/0039906 | A1 | 2/2004 | Oka |
| 2004/0083306 | A1 | 4/2004 | Gloe |
| 2004/0192364 | A1 | 9/2004 | Ranalli et al. |
| 2004/0250119 | A1 | 12/2004 | Shelest et al. |
| 2006/0129665 | A1 | 6/2006 | Toebes et al. |
| 2007/0061485 | A1 | 3/2007 | Horton |
| 2007/0094716 | A1 | 4/2007 | Farino |
| 2007/0250627 | A1 | 10/2007 | May |
| 2009/0031028 | A1 | 1/2009 | Kumar et al. |
| 2009/0112814 | A1 | 4/2009 | Statia et al. |
| 2009/0187649 | A1 | 7/2009 | Migault et al. |
| 2009/0187763 | A1 | 7/2009 | Freericks et al. |
| 2009/0196304 | A1* | 8/2009 | Sayenko .................. 370/432 |
| 2009/0203331 | A1 | 8/2009 | Ranalli et al. |
| 2010/0023611 | A1 | 1/2010 | Yang et al. |
| 2010/0034381 | A1 | 2/2010 | Trace et al. |
| 2010/0049982 | A1 | 2/2010 | Migault et al. |
| 2011/0162039 | A1 | 6/2011 | Trace et al. |
| 2013/0198316 | A1 | 8/2013 | Trace et al. |

FOREIGN PATENT DOCUMENTS

| | | |
|---|---|---|
| JP | 2007-174704 | 7/2007 |
| WO | WO 99/23571 | 5/1999 |
| WO | WO 2008/052760 | 5/2008 |
| WO | WO 2008/059150 | 5/2008 |

OTHER PUBLICATIONS

Chinese 2nd Office Action in Application 200980130982.3, mailed Apr. 16, 2013, 12 pages.

European Supplemental Search Report in application 09805342.4, mailed Feb. 7, 2013, 8 pages.

European Supplemental Search Report in application 09805343.2, mailed Feb. 7, 2013, 6 pages.

Suranjith Ariyapperuma et al: "Security vulnerabilities in DNS and DNSSEC", Availability, Reliability and Security, 2007. ARES 2007. The Second International Conference on, IEEE, PI, Apr. 1, 2007, pp. 335-342, ISBN: 978-0-7695-2775-8.

U.S. Appl. No. 12/189,065, Notice of Allowance mailed Mar. 26, 2013, 2 pages.

Wikipedia et al.: "Domain Name System", Oct. 4, 2006, pp. 1-11, Retrieved from the Interne!: URL:http://en.wikipedia.org/w/index.php?title=Domain Name System&oldid=79456430.

Bagnulo, M. et al., "Traffic Engineering in Multihomed Sites," Universidad Carlos III de Madrid, 2005, online at: http://www.it.uc3m.es/cjbc/papers/bagnulo_ISCC2005.pdf, 6 pages.

Chinese 1st Office Action in Application 200980130777.7, mailed Aug. 13, 2012, 14 pages.

Chinese 1st Office Action in Application 200980130982.3, mailed Aug. 10, 2012, 11 pages.

European Search Report filed Apr. 1, 2010, in Application No. 09805342 (4 pages).

European Search Report filed Apr. 1, 2010, in Application No. 09805343 (4 pages).

International Search Report and Written Opinion in Application PCT/US2009/051133, mailed Jan. 27, 2010, 10 pages.

Kanayama, K., "IPv6 Multi-Prefix Environment," APNIC Meeting 22-IPv6technical SIG, Intec NetCore, Inc., 2006, online at: http://www.apnic.net/meetings/22/docslipv6-pres-kanayama-multi-prefix.pdf, 9 pgs.

PCT International Search Report and Written Opinion in Application PCT/US2009/051143, mailed Jan. 29, 2010, 11 pages.

Sailer, R. et al., "Attestation-based Policy Enforcement for Remote Access," CCS'04, Oct. 25-29, 2004, online at: http://www.cse.psu.edu/~tjaeger/papers/ccs04.pdf, 10 pages.

U.S. Appl. No. 12/189,034, Amendment and Response filed Sep. 22, 2010, 8 pgs.

U.S. Appl. No. 12/189,034, Notice of Allowance mailed Nov. 24, 2010, 6 pgs.

U.S. Appl. No. 12/189,034, Office Action mailed Jun. 22, 2010, 6 pgs.

U.S. Appl. No. 12/189,065, Amendment and Response filed Jan. 31, 2012, 14 pgs.

U.S. Appl. No. 12/189,065, Amendment and Response filed Aug. 30, 2012, 15 pgs.

U.S. Appl. No. 12/189,065, Notice of Allowance mailed Dec. 19, 2012, 15 pgs.

U.S. Appl. No. 12/189,065, Office Action mailed Jun. 8, 2012, 12 pgs.

U.S. Appl. No. 12/189,065, Office Action mailed Oct. 31, 2011, 19 pgs.

U.S. Appl. No. 12/979,202, Amendment and Response filed Jan. 31, 2012, 7 pgs.

U.S. Appl. No. 12/979,202, Notice of Allowance mailed Sep. 21, 2012, 2 pgs.

U.S. Appl. No. 12/979,202, Notice of Allowance mailed Apr. 11, 2012, 7 pgs.

U.S. Appl. No. 12/979,202, Notice of Allowance mailed Aug. 2, 2012, 6 pgs.

U.S. Appl. No. 12/979,202, Office Action mailed Oct. 31, 2011, 5 pgs.

Verma, D., "Simplifying Network Administration Using Policy-Based Management," IEEE Network, Mar./Apr. 2002, p. 20-26, online at: http://dslab.csie.ncu.edu.tw /94 html/paper/pdf/SimplifYing%20Network%20Administration%20Using%20PolicyBased%20Managennent.pdf, 8 pgs.

Japanese Notice of Rejection in Application 2011-522099, mailed Jun. 28, 2013, 4 pgs.

Japanese Notice of Rejection in Application 2011-522101, mailed Jun. 28, 2013, 4 pgs.

Chinese 3rd Office Action in Application 200980130982.3, mailed Oct. 14, 2013, 11 pages.

Chinese 3rd Office Action in Application 200980130777.7, mailed Oct. 14, 2013, 8 pgs.

European Communication in Application 09805343.2, mailed Jan. 31, 2014, 5 pgs.

Japanese Notice of Allowance in Application 2011-522101, mailed Jan. 15, 2014, 4 pgs.

European Intention to Grant in Application 09805342.4, mailed Jan. 28, 2014, 6 pgs.

Japanese Notice of Allowance in Application 2011-522099, mailed Jan. 15, 2014, 4 pgs.

* cited by examiner

| Name ~202 | DNSSEC ~204 | DNS over IPsec ~206 | IPsec Encryption Level ~208 | IPsec CA ~210 | DNS server(s) ~212 |
|---|---|---|---|---|---|
| Textual identifier (Fully qualified domain name, DNS prefix, DNS suffix, IP address subnet) | Binary – on or off | Binary – on or off | None/Low/Medium/ High, or specific encryption protocol(s) | Textual identifier for one or more trusted certifying authorities for encryption | Identifiers (numerical and/or textual) for one or more acceptable DNS servers |
| *.microsoft.com | On | On | Medium | VeriSign | ns1.microsoft.com |
| *.corp.contoso.com | Off | Off | - | - | ns1.corp.contoso.com |

Columns 204–210 grouped under: DNS Protocol Security

200B — Direct Access

| Name | Zone-Specific DNS server(s) | Zone-Specific Proxy | Remote DNS over IPsec | Remote DNS Encryption Level | IPsec CA |
|---|---|---|---|---|---|
| Textual identifier (Fully qualified domain name, DNS prefix, DNS suffix, IP address subnet) | Identifiers (numerical and/or textual) for one or more acceptable DNS servers | One of: identifier (numerical and/or textual) for proxy server; use default; or none | Binary – on or off | None/Low/Medium/High, or specific encryption protocol(s) | Textual identifier for one or more trusted certifying authorities for encryption |
| 220 | 222 | 224 | 226 | 228 | 230 |

| | | | | | |
|---|---|---|---|---|---|
| *.microsoft.com | ns1.microsoft.com | None | On | High | VeriSign |
| *.corp.contoso.com | a.corp.contoso.com | prx.corp.contoso.com | Off | - | - |

...

Name Resolution Policy

Global Policy Settings — 812

| | |
|---|---|
| NLA Behavior | Whether to ignore Name Resolution Policy when outside the corporate network. Applies to Direct Access only. |
| | [NLA dependent ▼] |
| Fallback Behavior | How the DNS client show behave when a name resolution query fails, for example fall back to LLMNR or NetBIOS resolution. |
| | ● Fallback to LLMNR/NetBIOS   ○ No Fallback if DNS resolution fails |
| Query Behavior | Whether a DNS client can query in IPv6 only, prefer IPv6 or use default behavior (v4 with failover to v6) when outside the corporate network. |
| | [IPv6 only ▼] |

Description — Description here

Rule Definition — 802

Name: _____
The name or IP address of the area of the namespace to which the rule applies.

CA to use: _____  [Browse]
— 804

☑ DNS Security: — 806
- DNSSEC Validation?   ○ Yes  ● No
- IPsec Required?   ○ Yes  ● No
- IPSec Encryption:   [No encryption ▼]

☑ Direct Access: — 808
- DNS Server IPs:   [_____]  [Validate]
- DNS Proxy:   [Bypass proxy ▼] [_____]   Proxy name: <hostname>:<port>
- Remote IPsec?   ○ Yes  ● No
- Remote IPsec Encryption:   [No encryption ▼]

[Update] [Create] [Clear]
— 810

Policy

| Name | CA | DNSSEC | IPsec | IPSec Encry... | DNS Servers | DNS Prox... | DNS Prox... | Remote I... | Remote IPs... |
|---|---|---|---|---|---|---|---|---|---|

— 814

[Delete Rule] [Edit Rule]

[OK] [Cancel] [Apply]

FIG. 8

SECURE RESOURCE NAME RESOLUTION

CROSS-REFERENCE TO RELATED APPLICATIONS

This application is a divisional application of, and claims priority to, U.S. Pat. No. 8,332,487 filed on Dec. 27, 2010, which is a continuation of U.S. Pat. No. 7,917,616 filed on Aug. 8, 2008, entitled "SECURE RESOURCE NAME RESOLUTION" each of which is incorporated herein by reference in their entirety.

BACKGROUND

This invention relates to name resolution technologies. In computer communication networks, several different techniques may be used for identifying resources accessible via the network. These resources may include hosts attached to the network, such as client and server computing devices, as well as networking resources such as routers, gateways, firewalls, and others. In one technique, resources may be identified by one or more identifying numbers, such as a Medium Access Control (MAC) address or Internet Protocol (IP) address. It has been recognized, however, that while these addresses are useful for computer-to-computer communication, users often find it difficult to remember such identifying numbers and that this difficulty may deter users from accessing network resources. Resources may also, therefore, be additionally or alternatively identified by textual identifiers that are more easily remembered by users. Technologies which implement textual identifiers for identifying resources include NetBIOS, Local Link Multicast Name Resolution (LLMNR), and the Domain Name System (DNS).

Technologies that offer such textual identifiers may also offer translation services to match a textual identifier, which is easy for the user to remember, to a numeric identifier, which is easier for the computing device to process (or vice versa). In DNS, for example, when a user inputs to a computing device a textual identifier (a "domain name" in DNS) to initiate communication with a resource identified by that domain name, a DNS client on the computing device will query a DNS server to "resolve" the domain name into an IP address. The DNS server, upon receiving a query, will find an IP address corresponding to a domain name, either through information available to it locally or by querying other DNS servers, and return the IP address to the DNS client. The computing device can then initiate communication with the resource using the IP address.

It has been appreciated that some such name resolution technologies could be abused. In DNS, for example, an attacker may be able to misdirect a computing device to the attacker's own resource (e.g., the attacker's server) by responding to a DNS query with the IP address of the attacker's resource before the DNS server responds with the legitimate IP address. The computing device may then be misdirected and will connect to the attacker's resource rather than the legitimate resource. Then, while connected to the attacker's resource, the computing device may disclose data to the attacker or receive bogus data or malware from the attacker.

Some security technologies have been implemented to reduce the likelihood of this scenario by, for example, including randomized identifiers in each of the DNS queries and requiring that they be included in the response to the query, which will deter the attacker from responding with the hoax address unless the attacker is able to guess or detect the randomized identifier of the query. One security technology that has been proposed to solve these security concerns is the Domain Name System Security Extensions (DNSSEC) protocol, implemented with DNS. DNSSEC provides for digital signing of DNS results by certifying authorities (CAs) such that the results can be verified as accurate. Additionally, using DNS or DNSSEC with the Internet Protocol Security (IPsec) protocol has been proposed, to allow for encryption and/or authentication of the communications between a DNS client and a DNS server.

SUMMARY

The applicants have recognized and appreciated that the security of conventional name resolution technologies, including DNS, could be improved. Further, conventional name resolution techniques are not designed to operate in a manner to connect to several networks via a single network interface and a single set of network hardware, and thus the growth of overlay networks is deterred.

Described herein are principles for securing name resolution technologies and for ensuring that name resolution technologies can function in modern networks. Some of the approaches described are compatible with a network configuration having an overlay network accessible via the same interface as an underlying network. In accordance with some of the principles described herein, a set of resolution parameters may be implemented by a user, such as an end user or an administrator, to be used during a name resolution process for securing the process and/or for conducting the process in an overlay network. In some implementations, the set of resolution parameters may be maintained as a table of rules, and used to govern name resolution processes. For example, resolution parameters may be created to govern a DNSSEC session, or to govern how to communicate with networks implemented with Microsoft's Direct Access overlay technologies, or to govern communications using any other networking technology.

In some embodiments, there is provided a method comprising accepting as input a first identifier for a network resource, consulting a collection of sets of resolution parameters to determine a set of applicable resolution parameters that apply to the first identifier, and obtaining a second identifier. The second identifier may be obtained by conducting a name resolution process to determine the second identifier for the network resource based on the first identifier. The name resolution process is governed by the set of applicable resolution parameters.

In other embodiments, there is provided at least one computer-readable storage medium on which is encoded computer-executable instructions that, when executed, cause a computer to perform a method. The method comprises accepting as input from an application program a domain name for a resource accessible via a network, determining a set of applicable resolution parameters from a collection of sets of resolution parameters, and establishing a connection to a Domain Name Service (DNS) server on the network according to the set of applicable resolution parameters. The DNS server may be identified by the set of applicable resolution parameters. The method further comprises communicating a DNS query to the DNS server according to the set of applicable resolution parameters, receiving from the DNS server a response comprising a numeric identifier for the resource, and providing the numeric identifier to the application program.

In yet further embodiments, there is provided an apparatus comprising at least one processor and at least one tangible computer-readable storage medium on which is encoded a data structure comprising information relating to a set of resolution parameters. The data structure is stored in a manner usable by a name resolution software component to govern a name resolution process. The data structure comprises a first location in which information is to be recorded defining a set of one or more identifiers for network resources to which the resolution parameters apply, a second location in which information is to be recorded defining a type of security to be implemented on a communication channel over which the name resolution process is to exchange information, a third location in which information is to be recorded defining at least one trusted certifying authority, and a fourth location in which information is to be recorded defining at least one network resource with which the communication channel is to be established. The at least one tangible computer-readable storage medium comprises a plurality of instances of the data structure, each instance of the data structure being associated with a particular set of resolution parameter. The at least one processor is adapted to execute the name resolution software component, and the name resolution software component is adapted to perform the name resolution process in accordance with at least one set of applicable resolution parameters. The name resolution software component reads at least some of the plurality of data structure instances encoded on the at least one tangible computer-readable storage medium to determine one or more sets of applicable resolution parameters.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 2A and 2B illustrate tables of exemplary resolution parameters that may be implemented in accordance with some of the principles described herein;

FIG. 8 illustrates an exemplary user interface with which resolution parameters may be input;

DETAILED DESCRIPTION

Figure 1:
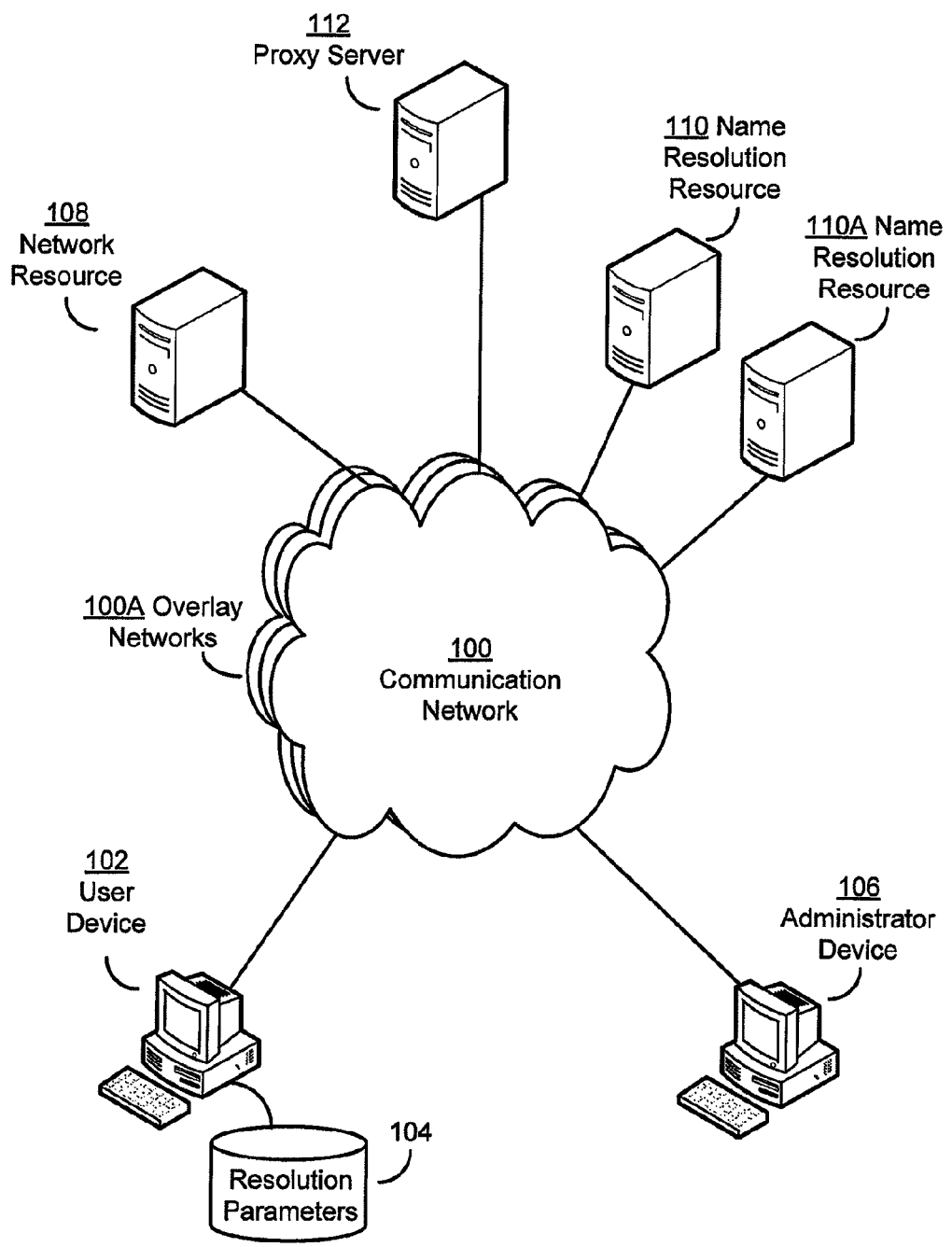
FIG. 1 illustrates an exemplary computer system in which techniques operating according to some of the principles described herein may act.

The applicants have recognized and appreciated that the security of conventional name resolution technologies, including DNS, could be improved. Further, conventional name resolution techniques are not designed to operate in a manner to connect to several networks via a single network interface and a single set of network hardware, and thus the growth of overlay networks is deterred.

For example, while DNSSEC has been proposed for ensuring that the results of a DNS query are legitimate, it relies on two conditions that many have found unacceptable. First, each of the DNS servers involved in responding to a DNS query (which may be in different locations and administered by different parties) must be implemented to handle DNSSEC, which makes for difficult rollout to the entire Internet. Second, the DNS client, rather than being a "stub resolver" that passes most of the responsibility for resolving a query on to a full resolver (a DNS server) as in normal DNS, would have to act essentially as a full resolver. This added processing to the client because the DNS client would become responsible for ensuring that each of the results returned to the DNS client is legitimate and correct by examining a digital signature for the result to determine whether the certifying authority (CA) that issued a certificate used in signing the result is one that should be trusted. Putting this responsibility onto the client computing device executing the DNS client has a risk of overburdening the computing device, which is of particular concern in less-powerful computing devices such as Personal Digital Assistants (PDAs) and mobile phones. To remove this burden from the client, it may be placed on a server or other network resource.

Further, conventional name resolution technologies are not adapted to work in situations where overlay networks may exist. In the past, a computing device might have connected to each network by a dedicated network interface, and that network interface would have been configured by the user and/or by devices on each network for interaction with those networks, including configuring the interface to support name resolution technologies implemented by the networks. For example, when a computing device such as a laptop was connected to a wired network, a Dynamic Host Configuration Protocol (DHCP) server on the network may have provided to the computing device an IP address, an identifier for a gateway, and an identifier for a DNS server, among other configuration parameters. Any communication through that interface that used a textual identifier, then, would be resolved through the DNS server. If a computing device wanted to connect to a different network or use a different name resolution technology, then a separate interface would have to be configured. For example, a second wired interface could be used, or a wireless interface could be used.

Applicants have recognized and appreciated that, in modern networks, "overlay" networks are becoming more common. These overlay networks are configured to co-exist with existing networks on the same hardware, and are logical overlays on top of existing hardware networks. Each of the network devices connected to the overlay network are also connected to one or more existing hardware networks, such as existing local area networks and/or existing wide area networks. Such overlay networks may be implemented in any of various ways, for example, using Microsoft Direct Access. The overlay network may therefore be considered a restricted subgroup of one or more other networks.

Using these technologies, a computing device connecting to a given hardware network, therefore, could be connecting simultaneously to multiple networks via a single interface, including the underlying network and one or more overlay networks. Conventional name resolution technologies would not be able to support such networks, as the type of name resolution protocol or the network resources with which a computing device should communicate for name resolution (e.g., which DNS servers) may be different for the overlay network(s) in comparison to the name resolution technology of the underlying network. Further, because some networks may keep private some information on how to access some resources on that network—for example, the location/identification of a certain secured server or other network resource—to keep that information from being given to potential attackers, a specific server or other resource may be the only possible source of the desired result of a name resolution query. Alternatively, a particular network resource may have an identifier that is unknown outside of the overlay network, or that is a duplicate of a textual identifier of another resource outside of the overlay network, and a specific server or other resource may be the only possible source of the desired result of a name resolution query for the particular network resource. Accordingly, it may be necessary for the computing device to contact a specific server or other resource during a name resolution process, which may be different for communication on the overlay network(s) than the underlying hardware networks, even if those overlay networks use the same name resolution technology. Because of this, it may be necessary for one network interface of a computing device to maintain multiple addresses of DNS servers for each of multiple overlay networks so that the computing device can communicate with each of the overlay networks. This is not possible with conventional computing devices, networking techniques, and name resolution technologies.

Described herein are principles for securing name resolution technologies and for ensuring that name resolution technologies can function in modern networks that have a plurality of overlay networks accessible via a single network interface. In some implementations, a user, such as an end user and/or an administrator, may compile a set of resolution parameters that may be applied to a computing device for use by one, some, or all of the network interfaces of the computing device for resolving names using name resolution technologies of networks accessible by the interface(s). These resolution parameters may then govern name resolution processes performed by the interface(s). For example, in one such implementations, the resolution parameters may specify DNSSEC parameters and/or parameters regarding Direct Access, though it should be appreciated that other name resolution technologies and other types of networks and security techniques may be used. These resolution parameters may be stored in any manner, for example, in a table of rules that may be examined by a name resolution module and used to assemble a name resolution query.

The resolution parameters may comprise any suitable information on how to carry out a name resolution process. Further, the specific parameters used may depend on the type of network for which name resolution is sought. For example, for a network on which DNSSEC is used as a name resolution technology, the parameters may include security parameters such as to which domains the resolution parameters apply, whether to confirm that the server validated a response, whether encryption should be used in communicating with the server, what type of encryption should be used, what certifying authority or authorities should be trusted to sign results, and which DNS server(s) should be queried for results. As another example, for an overlay network, such as one implemented using Direct Access, resolution parameters such as to which networks/domains the resolution parameters apply, which DNS server(s) should be queried for results, whether encryption should be used, what type of encryption should be used, what certifying authorities should be trusted to sign results, and what proxy server(s) should be used when communicating with an overlay network may be implemented. Any suitable resolution parameters may be used depending on the networks and name resolution techniques with which they may be implemented.

As used herein, a name resolution process may be any suitable technique for determining a numeric identifier corresponding to a textual identifier, or vice versa, in accordance with any suitable name resolution protocol. In the examples outlined below, the Domain Name Service (DNS) protocol may be used as an example of a name resolution protocol and name resolution processes may be described as conforming to the DNS protocol. It should be appreciated, however, that DNS is merely one example of a name resolution protocol with which techniques operating according to the principles described herein may operate, and that any suitable name resolution protocol may be implemented, as embodiments of the invention are not limited in this respect.

It should be appreciated that while many of the examples herein are described in the context of determining a numeric identifier that corresponds to an input textual identifier, in some embodiments name resolution processes may be implemented that additionally or alternatively take as input a numeric identifier and determine a corresponding textual identifier. Further, it should be appreciated that while the examples outlined below describe techniques that operate with a one-to-one correspondence of textual identifiers and numeric identifiers—determining a single numeric identifier that corresponds to a single textual identifier, for example—this is only one exemplary embodiment, and that in some implementations a textual identifier may have a plurality of corresponding numeric identifiers and a numeric identifier may have a plurality of corresponding textual identifiers.

The techniques described herein may be implemented in of various computing systems, examples of which are described in greater detail below. Such systems generally involve the use of suitably-configured computing devices implementing a number of functional modules, each providing one or more operations needed to complete execution of such techniques. Each functional module may be implemented in its own way; all need not be implemented the same way. As used herein, a functional module is a structural component of a system that performs an operational role. The operational role may be a portion of or an entire software element. For example, a functional module may perform a function of a process, a discrete process, or any other suitable unit of processing. A functional module may comprise computer-executable instructions, and may be encoded on a computer storage medium. Additionally, such computer-executable instructions may be written using any of a number of suitable programming languages and/or programming or scripting tools, and also may be compiled as executable machine language code or intermediate code that is executed on a framework or virtual machine. Functional modules may be executed in parallel or serially, as appropriate, and may pass information between one another using a shared memory on the computer on which they are executing, using a message passing protocol or in any other suitable way. Exemplary functional modules are described below carrying out one or more tasks, though it should be appreciated that the functional modules and division of tasks described is merely illustrative of the type of functional modules that may implement the exemplary techniques described herein, and that the invention is not limited to being implemented in any specific number, division, or type of functional modules. In some implementations, all functionality may be implemented in a single functional module. Further, the functional modules are discussed below, for clarity, as all executing on one or two computing devices, though it should be appreciated that, in some implementations, the functional modules may be implemented on many separate computing devices adapted to communicate with one another. For example, one computing device may be adapted to execute an input module to receive a first identifier, such as a textual identifier, and communicate with a name resolution module on a second computing device to perform a name resolution process to determine a numeric identifier corresponding to the textual identifier.

In one exemplary implementation of the principles described herein, a software application executing on a computing device may accept from a user input of a textual identifier of a desired network resource to which the software application would like to establish a connection. For example, the software application may be a web browser, the textual identifier may be a domain name of a web site, and the network resource may be a web server hosting the web site. To open a connection to the desired network resource, the software application or a connection module will use a numeric identifier for the network resource, and so a name resolution module (also referred to herein as a "resolution module") may convert the textual identifier to a numeric identifier acting as a network address, such as an IP address in IPv4 or IPv6 format.

The textual identifier for the network resource will therefore be passed to a name resolution module adapted to perform a name resolution process to obtain the numeric identifier, which the name resolution module may then return to the software application. Prior to performing the name resolution process, however, the resolution module may review a collection of sets of resolution parameters to determine which, if any, of the sets of resolution parameters apply to the name resolution process to be performed. This collection may be stored in any suitable manner, including in a computer storage medium, such as a memory, in any suitable format. To review the collection to determine which of the sets of parameters apply, the resolution module may retrieve some or all of the collection from memory and perform a comparison process of any kind, including, for example, comparing an input identifier to a parameter of some or all of the sets indicating to which network resources a particular set of resolution parameters applies.

Each set of resolution parameters in the collection may apply to one or more network resources, and may govern the manner in which a name resolution process determines identifiers for the network resources to which they apply. These resolution parameters may contain any suitable parameters that may affect how the name resolution process is carried out, including any of the exemplary parameters discussed above. For example, each set of name resolution parameters may specify a particular resolution resource with which the resolution module should communicate to determine the numeric identifier, such as a particular DNS server.

The review of the collection by the resolution module may be done in any suitable manner. In one implementation, the review may comprise comparing the textual identifier to an identifier for each of the sets of resolution parameters to determine whether there is a match between the identifiers. For example, the identifier for a set of resolution parameters may be a DNS suffix, such as "*.corp.contoso.com" such that any textual identifier that matches the latter portion of the identifier is one to which those resolution parameters apply.

Thus, if the input textual identifier is "webserver.corp.contoso.com," then that set would be a set of parameters associated with that identifier, and could be considered a set of applicable resolution parameters. Once the one or more sets of applicable resolution parameters is determined, a name resolution process may be carried out in accordance with the applicable resolution parameters. For example, if the parameters specify a particular resolution resource such as a DNS server, then a connection will be established to that resolution resource; if the parameters specify a level of encryption to be used, communications with a name resolution resource will use that level of encryption.

Once the resolution module has established a connection to the resolution resource using the applicable parameters, a resolution request is issued to the resolution resource over the connection, the resolution request including the textual identifier and requesting the corresponding numeric identifier. The resolution resource may perform any suitable process, including any of various processes that are known in the art, for determining the corresponding numeric identifier, such as by consulting information it maintains locally, or by forwarding the request to another resolution resource according to the applicable resolution parameters. Once the resolution resource has determined the numeric identifier, the resolution resource may perform any suitable validation process on the numeric identifier. For example, if the applicable resolution parameters specify that DNSSEC should be used to determine the numeric identifier and specify one or more particular certificate authorities that are trusted to provide a valid certificate that can be used to authenticate results, the resolution resource may, during the validation process, determine whether the result was signed using a certificate issued by any of the one or more particular certificate authorities. If so, the resolution resource may provide the numeric identifier to the resolution module on the computing device as a result of the resolution request. The resolution module may then confirm that the result was generated in accordance with the applicable resolution parameters, and present the result to the software application for use in establishing a connection to the desired network resource. If, on the other hand, the result was not signed using a designated certificate, the result may be discarded or provided to the resolution module with an indicator that it was not signed in accordance with the resolution parameters.

Several distinct advantages may be offered by performing a name resolution process in accordance with the principles described herein. First, by maintaining a collection of sets of resolution parameters, a name resolution process can be parameterized with the resolution parameters to ensure that the resolution process is secure and that results can be trusted. For example, while in conventional name resolution technologies a computing device had to trust that a result from a particular result was legitimate, resolution parameters from the collection allow a resolution module within a computing device to query a specific, trusted resolution resource to obtain an identifier (numeric or textual) for a desired network resource with a high confidence that a response is legitimate. Further, the resolution module can be more certain that the designated resolution resource will have the corresponding identifier that the module is seeking. In addition, by using the collection of resolution parameters, a resolution process may be made more secure, by specifying, for example, whether encryption should be used, what type of encryption should be used, and how the encryption should be validated. Further, by specifying particular resolution resources with which to communicate, the collection may enable the resolution module on the computing device to execute fewer functions and be less burdensome on the computing device, as some functions may be pushed onto network resources, such as resolution resources, that the collection indicates are adapted to handle. For example, in one exemplary DNS SEC implementation, some validation processes may be performed on a resolution resource in the network, such as a DNS server. The resolution module, having the collection, will know to contact the particular resolution resource that is capable of performing the DNSSEC tasks. Additionally, using the collection, a resolution module may be able to perform different name resolution processes for different input identifiers, such as contacting a particular resolution resource for a textual identifier for a network resource in an overlay network, or using a secure communication channel for exchanging identifiers related to particular secure network resources.

Additional functions and advantages of these and other techniques operating in accordance with the principles described herein will be more fully understood from the examples described below. The following examples are intended to facilitate an understanding of the invention and to illustrate the benefits of the principles described herein, but do not exemplify the full scope of embodiments of the invention.

Techniques operating in accordance with the principles described herein can be implemented in any suitable computer system comprising any suitable number and type(s) of computing devices, including any suitable number and type of network resources. FIG. 1 shows an illustrative computer system in which some exemplary implementations of the principles described herein may act. It should be appreciated, however, that other implementations may operate in any other suitable computer system.

FIG. 1 shows a computer system comprising a communication network 100 to which a user device, computing device 102, may connect. Communication network 100 may be any suitable wired and/or wireless network, including a portion of a larger wired and/or wireless network, such as a home network, a subnet of an enterprise network, the Internet, and/or others. Computing device 102 is shown as a desktop personal computer, but may be any suitable computing device such as a laptop personal computer, a PDA, a smart phone, a server, a rack-mounted computer, a networking device such as a router or switch, or other computing device.

Computing device 102 is coupled to a data store 104 storing a collection of sets of resolution parameters. The data store 104 may be encoded on any suitable computer storage medium or media, and may store information in any suitable format. Among the information stored in data store 104 are resolution parameters that can be used to govern a name resolution process for determining a second identifier corresponding to an input first identifier, such as determining a numeric identifier for a network resource corresponding to an input textual identifier. As discussed above, the resolution parameters may comprise any suitable information that may be used during a name resolution process. The computing device 102 may be adapted to execute one or more functional modules implementing such a name resolution process in which the resolution parameters are used to form a connection to network resources connected to the communication network 100.

The collection of sets of resolution parameters stored in data store 104 may be provisioned in any of various ways, including being input by a user local to computing device 102 using any suitable user interface and/or by being provisioned remotely by an administrator using a computing device 106. In one example, an administrator may specify the resolution parameters at the computing device 106 and push them down to computing device 102 through any suitable network management technique. For example, if the communication network 100 comprises a Microsoft Windows network available from the Microsoft Corporation of Redmond, Wash., then the administrator may use a domain controller to push the resolution parameters out using a Group Policy through the Active Directory protocol. It should be appreciated, however, that this is merely an example of a network management technique that may be implemented, and that any suitable technique may be used according to the resources available on the network.

The computing device 102 may use the collection of sets of resolution parameters to perform a name resolution process for determining an identifier (numeric or textual) for a network resource such as network resource 108, which may be any computing device accessible via a network, such as a server of any kind. To do so, the computing device 102, upon accepting an input of a first identifier for the network resource 108, may consult the collection of sets of resolution parameters stored in data store 104 to determine a set of applicable resolution parameters, and then perform a name resolution process governed by the set of applicable resolution parameters. During the name resolution process, a resolution module executing on the computing device 102 may communicate with a name resolution resource 110 to determine one or more identifiers for the network resource 108. Any suitable name resolution process may be executed in accordance with the principles described herein, including any of the exemplary name resolution processes described below. Such a process may include an exchange of information in any suitable manner with any suitable networking device as a resolution resource 110. While resolution resource 110 is illustrated in FIG. 1 as a server, it should be appreciated that any suitable computing device may be used as a resolution resource, including multi-purpose devices such as personal computers and single-purpose devices such as hardware name resolution devices.

In some implementations, the communication network 100 may not be a single network, but may be a hardware network having one or more overlay network(s) 100A instantiated on it. The overlay network(s) 100A may be instantiated entirely on the hardware implementing communication network 100, or may operate on hardware that used in communication network 100. The overlay network(s) 100A may share networking hardware with the communication network 100, such as routers and switches, but there may be some network resources, such as client and server computing devices, which are connected via hardware to communication network 100 but are not accessible to devices which are not members of the overlay network(s) 100A.

As discussed above, to communicate with network resources on the overlay networks, computing device 102 may have to communicate with particular resolution resources having information on the network resources available on the overlay network(s) 100A, because only these particular resolution resources have knowledge of the network resources available on the overlay network(s) 100A. In such implementations, the collection of sets of resolution parameters may specify one or more particular resolution resources 110A with which the computing device 102 can communicate during a name resolution process to obtain identifiers for network resources such as network resource 108. Some or all of the sets of resolution parameters in the collection may have identifiers that match network resources of the overlay network(s) 100A. When the resolution module of the computing device 102 reviews the collection to determine the set of applicable resolution parameters, the applicable resolution parameters may indicate that identifiers for the desired network resource may be retrieved from the particular resolution resource 110A. The name resolution process executed by the computing device 102, therefore, when parameterized with the set of applicable resolution parameters, may communicate with the specific resolution resource 110A to retrieve identifiers for the desired network resource 108. It should be appreciated that this review and name resolution process may be carried out in any suitable manner, including by any of the exemplary techniques described below.

Additionally, in some implementations, the applicable resolution parameters may also specify that communications to the network resource 108 should be done via a proxy server 112. In returning a second identifier for the network resource, then, the resolution module may additionally or alternatively return an identifier, such as a numeric or textual identifier, for the proxy server 112.

As discussed above, a set of resolution parameters may include any information that may be used in carrying out a name resolution process. FIGS. 2A and 2B illustrate exemplary data structures storing collections of sets of resolution parameters that may be used in some implementations in accordance with the principles described herein with two exemplary networking technologies. Additionally, while FIGS. 2A and 2B show two different collections comprising parameters relating to two different technologies, it should be appreciated that in some implementations these technologies may be implemented in the same set of resolution parameters. Further, a collection may be implemented as any suitable data structure, and may, in some implementations, comprise other data structures each storing information relating to one or more sets of resolution parameters. These data structures may be stored in computer-readable storage media associated with a client computing device that may request name resolution. It should be appreciated that the data structures shown in FIGS. 2A and 2B and the parameters they store are merely illustrative of the types of data structures and parameters that may be used, as any type or types of networking technologies may be used.

FIG. 2A shows a first data structure storing a collection 200A of resolution parameters, with two exemplary sets of resolution parameters in the collection. As shown in FIG. 2A, in some implementations the collection of resolution parameters may be organized as a table comprising a plurality of fields and rows, each field specifying a type of resolution parameter and each row specifying a set of resolution parameters, though other implementations are possible as any suitable format may be used. The illustrative resolution parameters shown in collection 200A include parameters relating to a DNS resolution process, such as whether to use a DNSSEC protocol and whether or how to implement other DNS security parameters. As mentioned above, however, it should be appreciated that DNS is merely exemplary of the types of name resolution technologies and protocols with which the principles described herein may operate, as any suitable name resolution protocol may be used.

The first illustrative resolution parameter shown in FIG. 2A is the "Name" parameter 202. This parameter 202 indicates to which identifiers a set of resolution parameters apply, and thus to which network resource(s) the set of resolution parameters may apply. The name parameter 202 may be used by a resolution module to determine which set(s) of resolution parameters in a collection apply to a given resolution process for an input identifier. The name parameter 202 may store any identifier for a network resource, including any numeric or textual identifier. For example, a numeric identifier may be an identifier for a specific network resource, such as IP address "1.2.3.4", or may be an identifier for a range of network resources, such as IP address subnet "157.0.0.0/8". Similarly, a textual identifier that may be used for the name parameter may be an identifier for a specific network resource, such as fully qualified domain name (FQDN) like "itweb.contoso.com.", or may be an identifier for a range of network resources, such as a DNS suffix like "*.contoso.com" or a DNS prefix like "itweb.*".

The next resolution parameter shown in FIG. 2A is the DNSSEC parameter 204. More specifically, the exemplary "DNSSEC" parameter stores a binary value (on or off) indicating that DNSSEC validation is required in a resolution process for network resources matching the name parameter. When the DNSSEC parameter 204 of a set of resolution parameters is set to on/true, a resolution resource may perform a resolution process in accordance with the DNSSEC protocol, and may ensure that any result is validated in accordance with the resolution parameters. A resolution module executing the resolution process may also ensure that any result of a DNS query has been validated according to DNSSEC standards, and may indicate in a transmitted DNS request that DNSSEC validation has been requested, for example by setting a "DNSSEC OK" (DO) flag in a header of the request.

The next parameters relate to the security of DNS exchanges between computing devices, for example between a DNS client and DNS server or any other set of devices. The first parameter, "DNS over IPsec" parameter 206, may store a binary (on/off or true/false) value indicating whether to implement IPsec on communication channels for a name resolution process. For example, if the IPsec parameter is set to true, then a resolution module may perform encryption and/or authentication processes when establishing a connection to a name resolution resource. If "DNS over IPsec" for a set of resolution parameters is set to on/true, then the resolution module may examine other parameters of the set to determine settings for the IPsec protocol. The next two parameters, "IPsec Encryption Level" 208 and "IPsec CA" 210 are examples of such parameters. "IPsec Encryption Level" may store any value that specifies whether encryption should be used, and/or what type of encryption should be used. The "IPsec Encryption Level" parameter 208 may store a None/Low/Medium/High value indicating particular types of encryption, for example, where "Low" may indicate a Triple Data Encryption Standard (3DES) or an Advanced Encryption Standard (AES) encryption of any size and "High" may indicate an AES encryption of 192 or 256 bits. Alternatively, the IPsec encryption level may store a reference to a particular encryption standard, such as AES(256). "IPsec CA" 210 may store an identifier for one or more certificate authorities that are trusted to issue authentication certificates for resolution resources. When set, during an authentication process of IPsec, the resolution module may confirm that a resolution result is authenticated with an authentication certificate issued by one of the trusted CAs to a trusted resolution resource. Additionally, if DNSSEC is turned on, then the response from the DNS server is checked to determine whether the Extended Key Usage (EKU) signature in the response comes from one of the trusted CAs and thus that the DNS server that produced the result is authorized, by the resolution parameters, to perform DNSSEC validation on behalf of the computing device.

The last parameter shown in FIG. 2A, "DNS server(s)" 212, may store a listing of one or more DNS server(s) with which a resolution module should communicate during a resolution process. When an identifier input to a resolution module matches the name parameter for a set of resolution parameters, then the resolution module will query any DNS server(s) listed in the "DNS server" parameter for identifiers corresponding to the input identifier. The "DNS server(s)" parameter may store any suitable identifier(s) for one or more DNS server(s) that may be used to establish a connection to the DNS server(s), including any suitable numeric and/or textual identifier(s).

FIG. 2A shows two illustrative data structures storing sets of resolution parameters that may form the collection 200A, each set comprising illustrative values that may be stored as the parameters of the collection. It should be appreciated that these sets are examples of the types of sets that may be used, and that any values may be used as parameters and that any number of sets of parameters may be used.

FIG. 2B shows a second exemplary data structure storing a collection 200B of resolution parameters. As in FIG. 2A, the collection 200B is organized as a table having a plurality of fields identifying parameters and a plurality of rows identifying sets of resolution parameters, but it should be appreciated that any format may be used. Further, in the example of FIG. 2B, the resolution parameters include those that may be used in connection with a Microsoft Direct Access functionality for an overlay network. It should be appreciated, however, that Direct Access is merely exemplary of the type of networking technologies and protocols with which the principles described herein may operate, as any suitable networking technology, including any suitable overlay networking technology, may be used.

The first parameter shown in FIG. 2B is the "Name" parameter 220. Similar to the Name parameter 202 of collection 200A, this parameter identifies the network resource(s) to which a set of resolution parameters may apply, and may be used by a resolution module to determine which set(s) of resolution parameters in a collection apply to a given resolution process for an input identifier. The name parameter 220 may store any identifier for a network resource, including any numeric or textual identifier, including any of the exemplary parameters described above in connection with collection 200A.

The next parameters in FIG. 2B relate to Direct Access technologies. The "Zone-Specific DNS server(s)" parameter 222 may store any suitable identifier(s) for one or more DNS servers that may be queried as part of a name resolution process for network resources available on an overlay network. As discussed above, in some overlay networks, some network resources may not be available for general access by all computing devices on the hardware network on which the overlay network exists, and this restriction may be partially enforced by not distributing widely the identifiers for the network resources. To obtain an identifier for a network resource on an overlay network, then, a resolution module may contact one or a small set of resolution resources. Accordingly, if an identifier input to a resolution module matches the name parameter 220 for a set of resolution parameters, then the resolution module may contact a DNS server specified in the "Zone-Specific DNS Server(s)" parameter 222 to obtain a corresponding identifier for the network resource.

"Zone-Specific Proxy" 224 is the next parameter shown. This parameter 224 may be used by the resolution module to indicate to a software application that the software application is contacting a network resource on an overlay network, and to configure the software application to use a proxy server to perform its connections, or to use an identified proxy server to perform its connections. For example, if the software application desires a connection to a particular network resource and the set of applicable resolution parameters indicates to the resolution module that a proxy server should be used, then the resolution module may indicate to the software application that it should connect to the network resource via the proxy server. The proxy server parameter 224 of the collection 200B may store any acceptable value, including a numeric and/or textual identifier for a resource, a null value or other indicator that no proxy server is required, or a value indicating that the default proxy server settings should be used by the software application.

The next parameter, "Remote DNS over IPsec" 226 is used to indicate whether connections to network resources on the overlay network should be secured in accordance with the IPsec protocol, such as with encryption and/or authentication. As with the "DNS over IPsec" parameter 206 of collection 200A, the "DNS over IPsec" parameter 226 of collection 200B may take a binary value, such as on/off or true/false, indicating whether to use IPsec. Also similarly to collection 200A, the "Remote DNS Encryption Level" 228 may store any suitable value indicating whether and what types of encryption should be used in securing the connection to a resolution resource, and "IPsec CA" 230 may store any suitable identifier for one or more certificate authorities that are trusted to issue authentication certificates for resolution resources.

As with FIG. 2A, FIG. 2B also shows two illustrative data structures storing sets of resolution parameters that may form the collection 200B, each set comprising illustrative values that may be stored in the parameters of the collection. It should be appreciated that these sets are examples of the types of sets that may be used, and that any values may be used as parameters and that any number of sets of parameters may be used.

Further, it should be appreciated that while the two collections 200A and 200B are shown separately and address two different technologies—DNS security/DNSSEC and Direct Access—it should be appreciated that in some implementations a set of resolution parameters may include parameters directed to both of these technologies and/or to any other type(s) of networking technology. For example, for a given overlay network, the set of resolution parameters may instruct a resolution module to use DNSSEC and other DNS security to perform name resolution for the overlay network.

In some techniques operating in accordance with the principles described herein, additional resolution parameters may be included in a collection of resolution parameters, but which are not a part of any particular set of resolution parameters. These global parameters may also be used to govern a resolution process, but may indicate when or whether to use any of the sets of resolution parameters, may indicate how to handle failures in name resolution, or may be resolution parameters which apply to all sets. For example, if a computing device supports Network Location Awareness (NLA) which may inform the computing device of the hardware network to which it is connected, the collection may include a global setting indicating whether to forego review of all or a portion of the table based in the type or identity of the network to which the device is connected. For example, if the NLA indicates that the computing device is not connected to a particular hardware network on which there exists an overlay network, then an "NLA Bypass" parameter may indicate to the resolution module that it should forego reviewing all sets directed to overlay networks, or may indicate that it should forego reviewing all sets of resolution parameters for a particular overlay network.

Additionally or alternatively, a global parameter may indicate how to issue a resolution request if outside of a particular network. For example, if the computing device is outside of a particular hardware network, then a "Query Behavior" parameter may indicate that the resolution module should query for particular types of identifiers, such as IPv6 numeric identifiers prior to IPv4 numeric identifiers, or only IPv6 numeric identifiers. Another global parameter may relate to how to react if the name resolution process fails, in that a second identifier is not located in accordance with the set of applicable resolution parameters. This "Fallback Behavior" parameter may indicate that the resolution module should attempt to use alternative name resolution technologies, or may indicate that no fallback is allowed. For example, the parameter may indicate that, if a DNS process fails, a LLMNR or NetBIOS process should be attempted.

Figure 3:
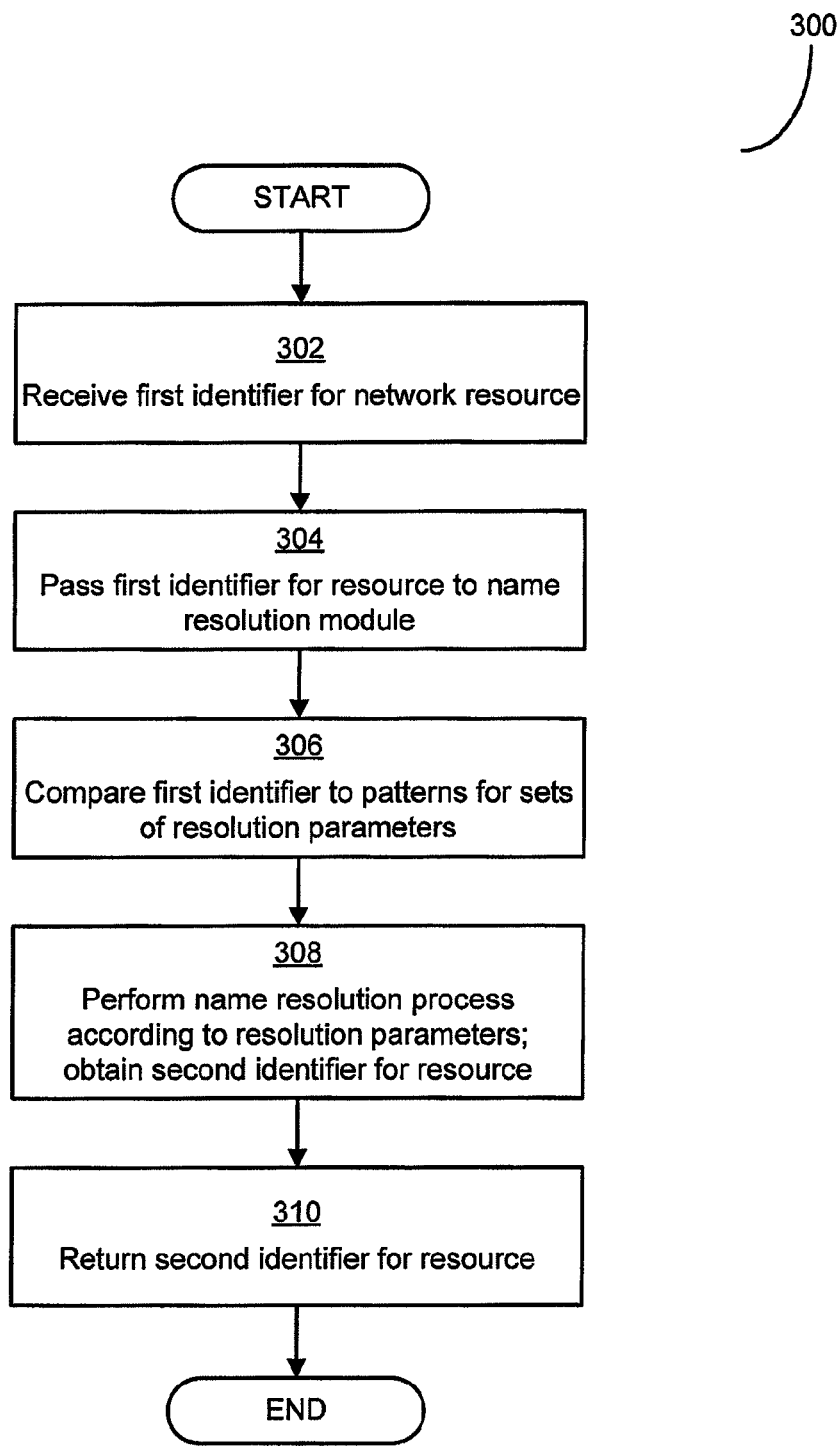
FIG. 3 is a flowchart of an exemplary process for performing a name resolution that may be implemented in accordance with some of the principles described herein.

These exemplary collections and resolution parameters, and any other suitable resolution parameters in any suitable collection, may be used by a resolution module to execute a name resolution process in accordance with any type or types of name resolution technologies. Any suitable name resolution process may be implemented and governed by the set of applicable resolution parameters. FIG. 3 shows a process 300 by which name resolution may be carried out. It should be appreciated, however, that the process 300 is merely exemplary of the types of techniques that may be implemented, as any suitable technique may be used.

Process 300 begins in block 302, in which a first identifier for a network resource is received by a functional module of a computing device. The first identifier may be received by and from any suitable sources, including from a user via a suitable user interface, including by a user interface of a software application. The first identifier may be any suitable identifier for a network resource, including any suitable textual identifier in accordance with a name resolution protocol, such as a domain name of the DNS protocol. In block 304, the first identifier may then be passed to a name resolution module to determine a second identifier for the network resource. This may be done for any reason. For example, if the first identifier was a textual identifier received by a software application, then the software application may determine that it requires as the second identifier a numeric identifier for the network resource to establish a connection to the network resource. This use case is merely exemplary, however, as the principles described herein are compatible with name resolution processes executed with any suitable motivation.

In block 306, the resolution module determines whether the collection has any set of resolution parameters which apply to the identifier for which name resolution is sought. This can be done in any suitable manner. For example, the resolution module may retrieve from a data store a collection of sets of resolution parameters, and compare the first identifier to the collection to determine which, if any, of the sets of resolution parameters apply to the first identifier. This comparison may be done in any manner, such as by comparing the first identifier to the "name" parameter described above in FIGS. 2A and 2B. The resolution module may then determine that one or more of the sets of resolution parameters apply to a name resolution process to be executed by the module, and may either use the set of applicable resolution parameters to govern the process or determine a set of applicable resolution parameters by merging multiple sets of resolution parameters in any suitable manner.

Figure 4:
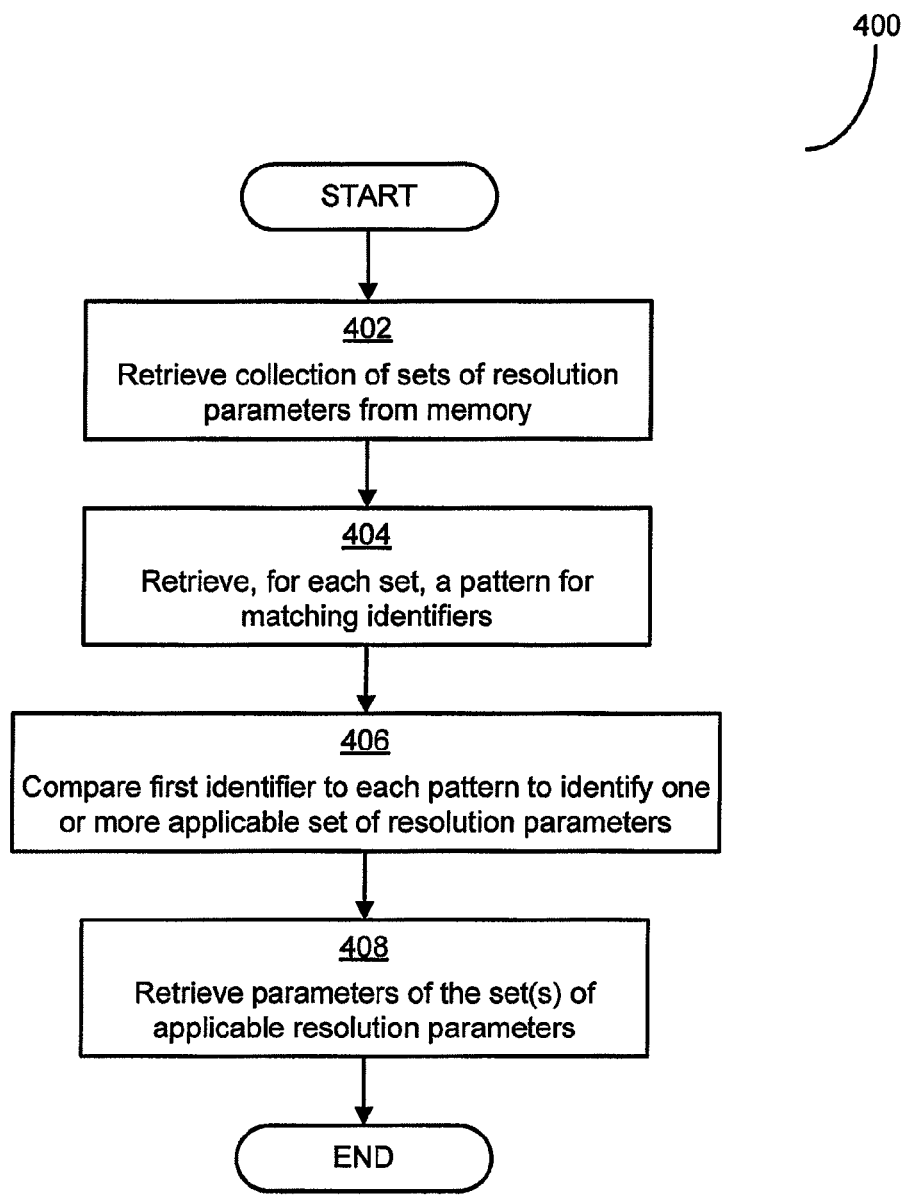
FIG. 4 is a flowchart of an exemplary process for identifying a set of applicable resolution parameters that may be implemented in accordance with some of the principles described herein.

The determining of a set of applicable resolution parameters of block 306 may be carried out in any suitable manner. The exact manner in which it is carried out may depend on the format of the collection, and on the resolution parameters chosen to be included in the collection. FIG. 4 shows one example of a determination process, but it should be appreciated that the process 400 is merely illustrative of the acts that may be performed as part of block 306 of process 300, and that other processes are possible.

Process 400 begins in block 402, at which the resolution module accesses a collection of sets of resolution parameters from a data store. This data store may be local to the computing device on which the resolution module is executing, as in the example of FIG. 1, or it may be available to it via any suitable communication medium or media such as a computer communication network. In block 404, the resolution module may retrieve, for each set of resolution parameters in the collection, a pattern for matching identifiers that indicates to which identifiers for network resources each set applies. The pattern may be any suitable indicator of network resources, including the name parameter described above in connection with FIGS. 2A and 2B or any other numeric or textual indicator. In block 406, the first identifier is compared to each pattern to determine whether the set of resolution parameters that corresponds to a pattern applies to the first identifier. For example, if the first identifier is "webserver.corp.contoso.com" and a pattern is "*.corp.contoso.com" (where * is a wildcard character), then it may be determined in block 406 that that set of resolution parameters applies to the first identifier.

In block 408, once the set(s) of applicable resolution parameters are determined, then the parameters of the set(s) are retrieved to be used to govern a name resolution process. In some implementations, only a single set of resolution parameters will be retrieved as a set of applicable resolution parameters, while in others multiple sets of resolution parameters may be retrieved. If multiple sets are obtained, any suitable process may be used to determine the set of applicable resolution parameters from the multiple sets of resolution parameters. For example, the parameters may be merged to determine a set of applicable resolution parameters that has the highest level of security, or the lowest level of security, or any other suitable standard. As another example, if multiple sets of resolution parameters match, then the resolution module may select the set that has a pattern that matches most closely. For example, if the first identifier is "a.corp.ms.com" and there is a set in the collection for "corp.ms.com" and a set for "ms.com," then the set of resolution parameters for "corp.ms.com" may be selected because it is more specific.

Returning to process 300 of FIG. 3, in block 308, once the set of applicable resolution parameters has been determined, the resolution module may perform a name resolution process parameterized with the set of applicable resolution parameters. The resolution module may then obtain, as the output of the resolution process, a second identifier for the network resource. For example, if the first identifier is a textual identifier, the second identifier may be a numeric identifier such as an IP address, or vice versa. In block 310, the resolution module may then return the second identifier to the functional module that passed the first identifier to it in block 302, and the process ends.

Figure 5:
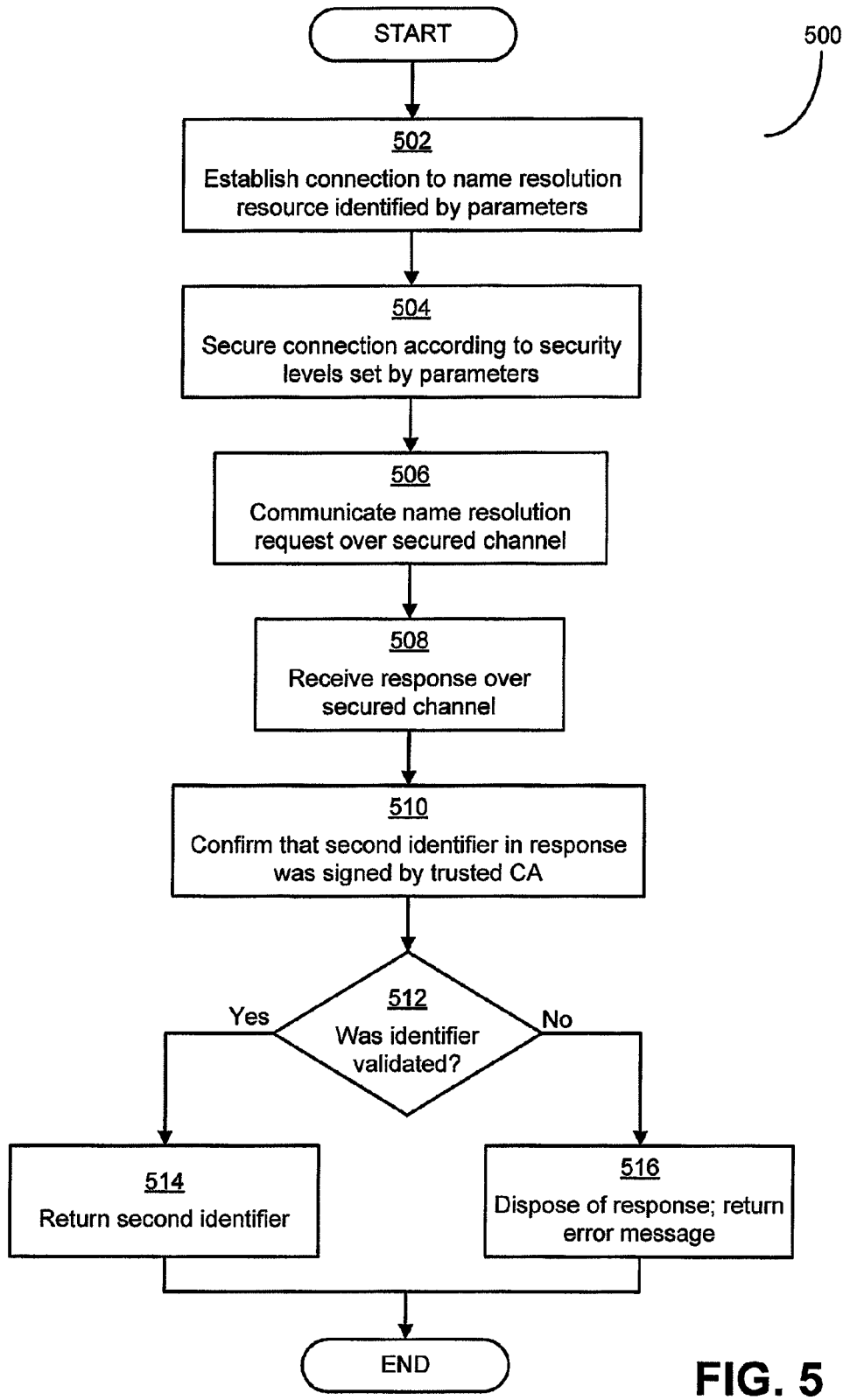
FIG. 5 is a flowchart of an exemplary process for resolving a textual identifier into a numeric identifier that may be implemented in accordance with some of the principles described herein.

The acts of blocks 308 and 310 may be carried out in any suitable manner. FIG. 5 shows an exemplary process 500 by which a name resolution process, parameterized with a set of applicable resolution parameters, may be performed. It should be appreciated, however, that the process 500 is merely illustrative of the types of name resolution processes that may be implemented, as any suitable process may be implemented in accordance with any suitable name resolution technologies and protocols. It should also be appreciated that while process 500 is described in terms of certain resolution parameters, these parameters are also only exemplary, as any suitable parameters may be used in accordance with the principles described herein.

The process 500 of FIG. 5 begins in block 502, wherein the resolution module establishes a connection to a name resolution resource identified by the set of applicable resolution parameters, such as by a "DNS server(s)" parameter. Depending on the type or types of name resolution technologies and protocols implemented, the nature of the resolution resource may change. In some implementations, however, the name resolution resource may be a network resource such as a DNS server. In block 504, in accordance with a "DNS over IPsec" parameter that is set to on/true, the connection to the resolution resource may be secured. The security of the connection may depend on other parameters, such as an "Encryption Level" parameter identifying a type of encryption to use and/or an "IPsec CA" parameter identifying one or more certificate authorities that can issue certificates authenticating an identity of the resolution resource. Techniques for securing of communication connections using an IPsec protocol are known in the art, and as such will not be discussed further herein.

In block 506, once the connection to the resolution resource is secured, the resolution module may communicate a name resolution request over the channel. The resolution request may include any suitable data for performing a name resolution, including the first identifier and any parameters indicating a process that the resolution resource may need to follow. For example, the resolution request may indicate, in accordance with a parameter of the set of applicable resolution parameters, that DNSSEC has been enabled for the resolution request and that the resolution resource should perform a validation process on the second identifier in accordance with DNSSEC prior to returning the second identifier. For example, the resolution request may include one or more indicators for one or more certificate authorities that the set of resolution parameters indicates are trusted for returning trusted results, and the resolution resource may confirm that one of these is used.

Any suitable technique may be carried out by the resolution resource to obtain a second identifier for a network resource, in accordance with the particular name resolution technologies selected and indicated by resolution parameters. For example, if the resolution resource is a DNS server, then the resolution resource may examine its local cache of identifiers to determine whether it "knows" of a second identifier corresponding to the first identifier received in the resolution request. If a second identifier is not in its cache, then it may pass the resolution request along to another DNS server, which may then carry out the same process. This will continue until the original resolution resource receives a response including a second identifier. If DNSSEC is indicated by the set of applicable resolution parameters to be "on," then when the resolution resource obtains a result—either from its own cache or from another DNS server—then the resolution resource may examine the result to determine if it has been "signed" by a trustworthy source that can vouch for the legitimacy of the result. If the result is determined to be valid, then it may be returned to the resolution module that issued the resolution request.

In block 508, the resolution module receives the response from the resolution resource over the secured channel and, in block 510, confirms that the second identifier was validated by the resolution resource and was signed by a trusted certificate authority. In block 512, based on the determination of block 510, the resolution module determines whether the identifier was validated in accordance with the set of applicable resolution parameters. If the second identifier was validated, then in block 514 the second identifier is returned the functional module that originally issued the request by providing the first identifier (as in block 302 of FIG. 3) and the process ends. If, on the other hand, the response was not validated in accordance with the set of applicable resolution parameters, then in block 516 the resolution module disposes of the result and returns to the functional module an error message indicating that no result was found, and the process ends.

Figure 6:
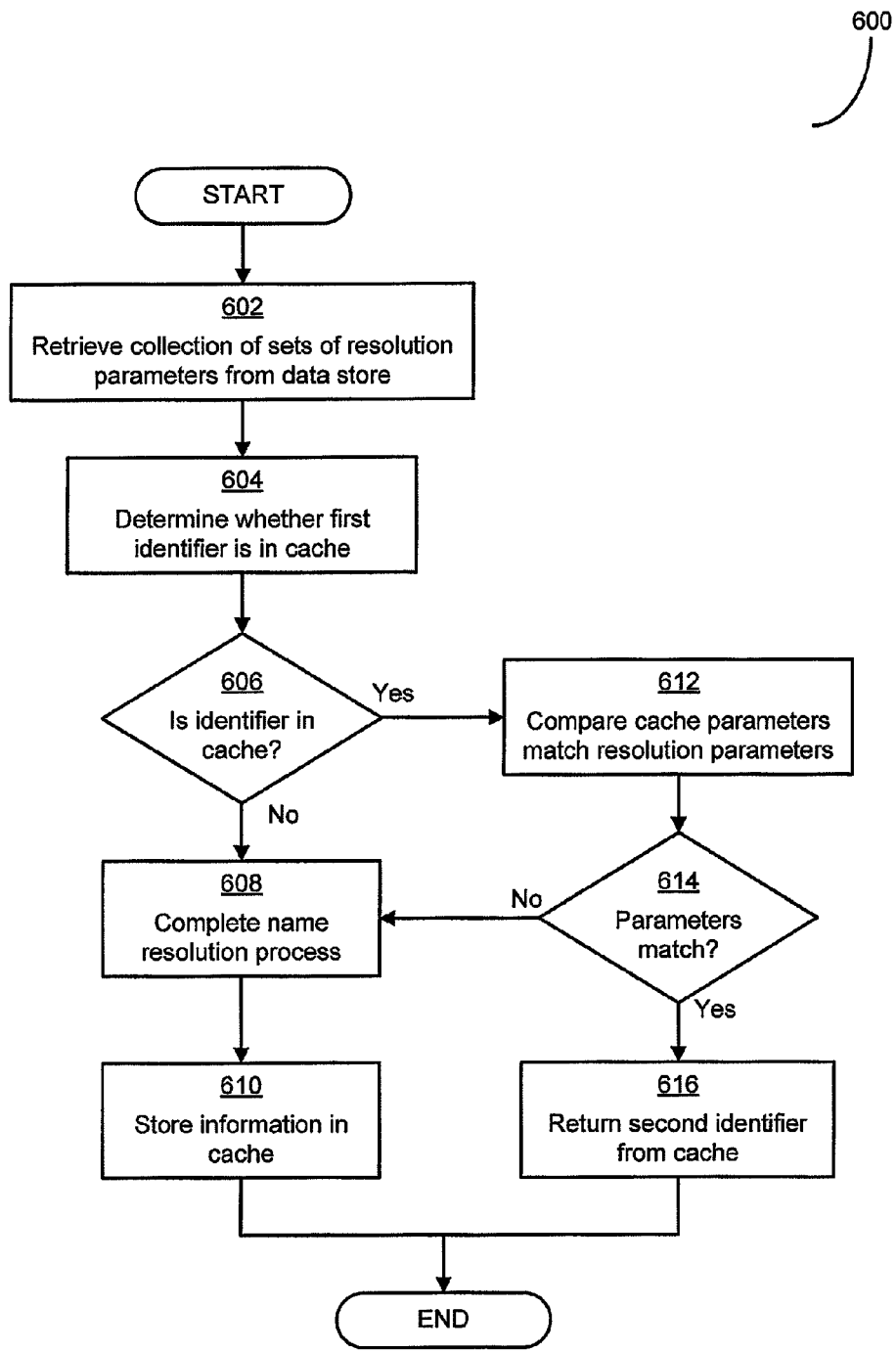
FIG. 6 is a flowchart of an exemplary process for determining whether an identifier stored in a cache may be returned as a result of a name resolution process that may be implemented in accordance with some of the principles described herein.

In some implementations, a resolution module may also maintain a local cache of identifiers for network resources. The resolution module, upon receiving a response to a resolution request containing a second identifier, may store in a cache the first identifier, the second identifier, and the resolution parameters used to obtain the second identifier. Then, when the resolution module receives a new request for a second identifier, the resolution module may examine the cache to determine if it already has stored the second identifier, and if so, may return the second identifier from the cache without issuing a resolution request to a resolution resource. FIG. 6 shows an exemplary process 600 for performing such a resolution process using a cache. It should be appreciated, however, that the process 600 is merely illustrative, and any suitable technique may be implemented in accordance with the principles described herein.

The process 600 begins in block 602, wherein the resolution module receives a first identifier and determines a set of applicable resolution parameters. This may be done in any suitable manner, including by any of the exemplary techniques described above. In block 604, the resolution module may examine a cache to determine whether the first identifier is listed in the cache. If, based on a decision in block 606, the first identifier is not in the cache, then in block 608 the name resolution process continues as discussed above. When the second identifier is obtained by the name resolution process, then information describing the act of obtaining may be stored in the cache in block 610. This information may comprise any of various types of data and instructions on the obtaining process. For example, the information may comprise the first identifier, the second identifier, and/or the set of applicable resolution parameters used in the act of obtaining. Once the information is stored in the cache, the process 600 ends.

On the other hand, if the first identifier is determined in block 606 to be in the cache, then in block 612 the set of resolution parameters stored in the cache along with the first identifier is retrieved and compared to the set of applicable resolution parameters retrieved in block 602. This comparison may be done to ensure that any second identifier returned from the cache is an identifier that was obtained in accordance with the set of applicable resolution parameters. For example, the comparison of block 612 may determine that the parameters are equal, or that the parameters used to obtain the identifier stored in the cache are at least as secure as the parameters retrieved in block 602. Alternatively, the comparison of block 612 may determine that the source of the second identifier in the cache—the resolution resource from which the second identifier was obtained—is the same as the source required by the set of applicable resolution parameters. As another example, the cache may instead store a time the second identifier was retrieved, and the resolution module may compare that to a last time the resolution parameters were edited to determine if the resolution parameters are the same at the time of execution as they were at the time the identifier in the cache was retrieved. Any suitable comparison process may be carried out in block 612.

In block 614, if the parameters do not match, then a name resolution process is carried out as described above, in accordance with the set of applicable resolution parameters, to ensure that any identifier obtained is obtained appropriately. If, however, in block 614 it is determined that the parameters match, then in block 616 the second identifier is returned from the cache to the functional module that provided the first identifier, and the process 600 ends.

Described above are several different techniques for determining a second identifier based on a first identifier input to a resolution module by a functional module. It should be appreciated, however, that each of these techniques is merely illustrative of the types of techniques that may be implemented in accordance with the principles described herein. Any type or types of methods may be implemented to carry out a name resolution process to determine identifiers for network resources based on name resolution technologies, whether implemented as a hardware network or an overlay network, or based on resolution parameters that have been provisioned for a resolution module.

Figure 7:
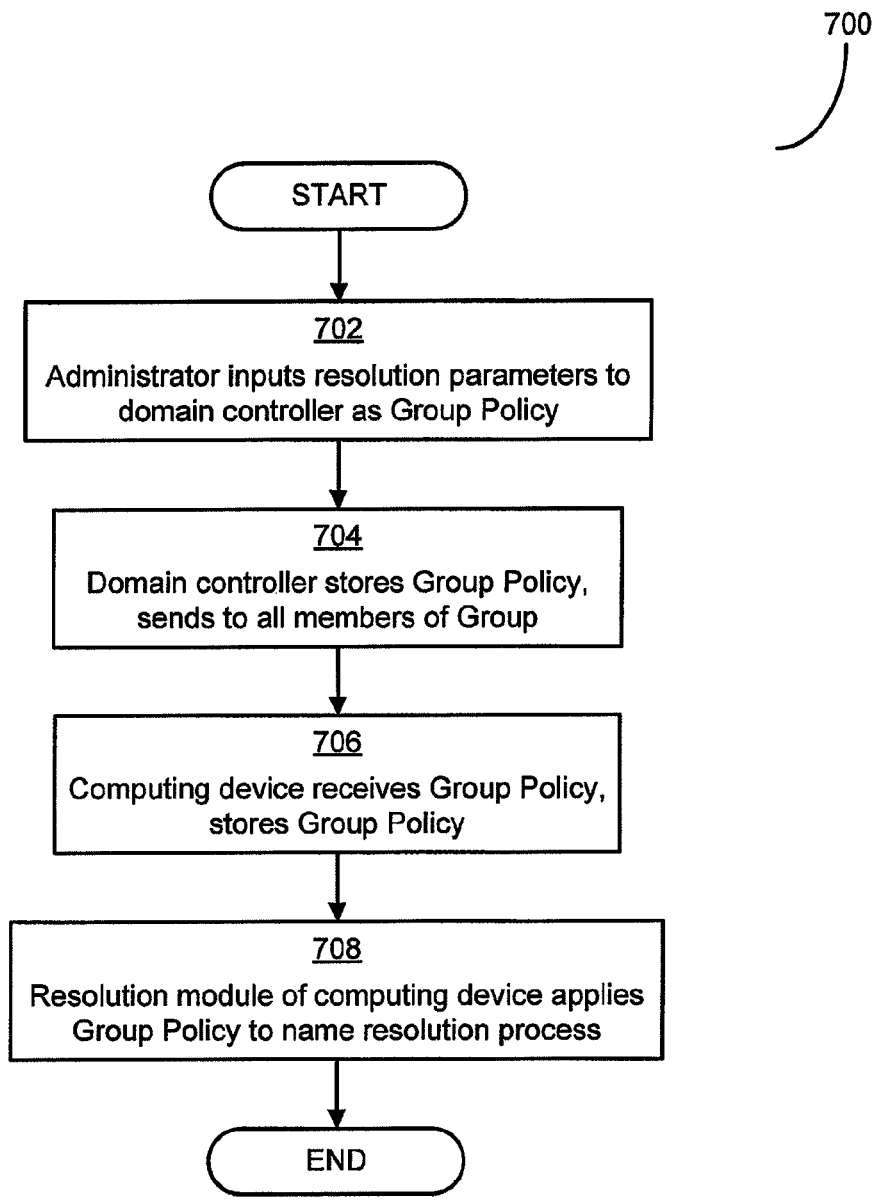
FIG. 7 is a flowchart of an exemplary process for establishing a set of resolution parameters that may be implemented in accordance with some of the principles described herein.

The resolution parameters that are provisioned for a resolution module may be provisioned in any suitable manner. For example, in one implementation, the resolution parameters may be entered locally by a user of a computer device and stored in a data store associated with the computing device. In another implementation, the resolution parameters may be provided over a network when the computing device connects to the network. FIG. 7 shows an example of one such latter process for providing resolution parameters to a computing device via a network. It should be appreciated, however, that the process 700 of FIG. 7 is merely illustrative, and others are possible. Further, it should be appreciated that while the example of FIG. 7 is described in terms of a Microsoft Windows computer network, other networks are possible in which computing devices are configured by the network at the time they connect to the network.

The process 700 begins in block 702, wherein an administrator inputs a collection of resolution parameters into a domain controller of the network. This collection of resolution parameters may be input in any suitable manner, including as a part of a Microsoft Active Directory Group Policy for the network. The Group Policy may apply to any portion of the network, including to a group of computing devices connected to the network and/or to a group of users of the network. In block 704, the domain controller receives the resolution parameters and stores it as a Group Policy, then transmits the Group Policy to all members of the group. This transmission of block 704 may be carried out after a set time period, such as every 15 minutes, or when members of the group (either computers or users) join or sign onto the network. In block 706, a computing device executing a resolution module as described herein receives the Group Policy in any suitable manner and stores it in a data store associated with the computing device. Then, in block 708, when executing a name resolution process, the resolution module applies the collection of resolution modules to the name resolution process in any suitable manner, including any of the exemplary techniques described above.

Any suitable user interface may be used to input resolution parameters. For example, in some implementations a text-based command line tool may be used to input resolution parameters. In other implementations, a graphical user interface may be used to input resolution parameters. FIG. 8 shows an example of one such graphical user interface that may be used in accordance with some of the principles described herein. It should be appreciated, however, that some implementations may use alternative user interfaces, as embodiments of the invention are not limited to using any particular input technique for resolution parameters.

The graphical user interface 800 comprises a number of controls that may be used to input resolution parameters. A text block 802 may be used to input a name for a network resource, including a pattern to be used to match names of network resources, as in the "name" parameter described above in connection with FIGS. 2A and 2B. The graphical user interface may also comprise a text block 804 to input information relating to a certificate authority that may be used for an IPsec security process and/or for signing identifiers in accordance with secure name resolution technologies like DNSSEC. A series of controls 806 related to DNS Security may also be implemented, with controls indicating parameters such as whether to require DNSSEC validation, whether to use IPsec, and what type of encryption to use if IPsec is to be used. Another series of controls 808 may also be implemented for use with overlay networks such as Direct Access, accepting parameters such as identifiers for acceptable resolution resources such as DNS servers, an identifier for a proxy server to use, whether to use IPsec, and what type of encryption to user if IPsec is to be implemented. The graphical user interface 800 also comprises buttons 810 for creating and updating a set of resolution parameters including the parameters input in each of the controls 802-808. Other, global resolution parameters may also be input to the graphical interface via a frame 812. Once a set of resolution parameters has been created, it may be displayed in a frame 814 at the bottom of the graphical user interface 800, which has a plurality of columns aligning to types of parameters that may be input using the interface 800.

When a set of parameters is created or updated using the graphical user interface 800, the set of parameters may be stored in any suitable data structure in any suitable format. The data structure may be stored in a data structure storing a collection of sets of resolution parameters, such as the collections 200A and 200B of FIGS. 2A and 2B. These data structures, as discussed above, may be encoded on any suitable computer storage medium. Accordingly, when a user inputs parameters using the graphical user interface 800, the graphical user interface 800 may initiate a recording process to record the input parameters onto a computer-readable medium in any suitable manner.

Techniques operating according to some or all of the principles described herein may be implemented in any suitable manner. For example, in some embodiments, the techniques may be implemented as computer-executable instructions encoded on one or more computer-readable storage media such as magnetic media (e.g., a hard disk drive), a Compact Disk (CD), a Digital Versatile Disk (DVD), a persistent or non-persistent solid-state memory (e.g., Flash memory, Magnetic RAM, etc.), or any other suitable storage media. The computer storage media may be implemented as computer-readable storage media 906 of FIG. 9 (i.e., as a portion of a computing device 900) or as a separate computer storage medium. It should be appreciated that, as used herein, a "computer-readable medium," including "computer-readable storage medium," refers to tangible storage media having at least one physical structure that may be altered in some way during a process of recording data thereon. For example, a magnetization state of a portion of a physical structure of a computer-readable medium may be altered during a recording process.

In some such embodiments, the computer-executable instructions implementing the techniques operating in accordance with the principles described herein may be implemented as one or more stand-alone functional modules (e.g., the resolution module described above). As described above, a "functional module" is a structural component of a system which performs a specific operational role, however instantiated, which may be a portion of or an entire software element (e.g., a function or a discrete process). Generally, functional modules include routines, programs, objects, components, data structures, etc. that perform particular tasks or implement particular abstract data types. Typically the functionality of the functional modules may be combined or distributed as desired in various embodiments. These functional modules may, in some implementations, be adapted to interact with other, unrelated functional modules and/or processes, such as functional modules implementing a software program application or implementing an operating system for a computing device, or, in other implementations, the modules may be adapted to interact with other functional modules which, together with the modules, form an overall system such as an operating system such as the Microsoft Windows operating system, available from the Microsoft Corporation of Redmond, Wash. (i.e., the functional modules may be implemented as a portion of or outside of an operating system). It should also be appreciated that, in some implementations, some functional modules may be implemented separately from others, or some functional modules may not be implemented.

In some, but not all implementations, the techniques may be embodied as computer-executable instructions that may be executed on any suitable computing device(s) operating in any suitable computer system, including the exemplary computer system of FIG. 1. For example, techniques operating according to some or all of the principles discussed herein may operate on a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more application-specifics integrated circuits (ASICs) for carrying out the techniques described herein, one or more Field-Programmable Gate Arrays (FPGAs) for carrying out the techniques described herein, or any other suitable system.

Figure 9:
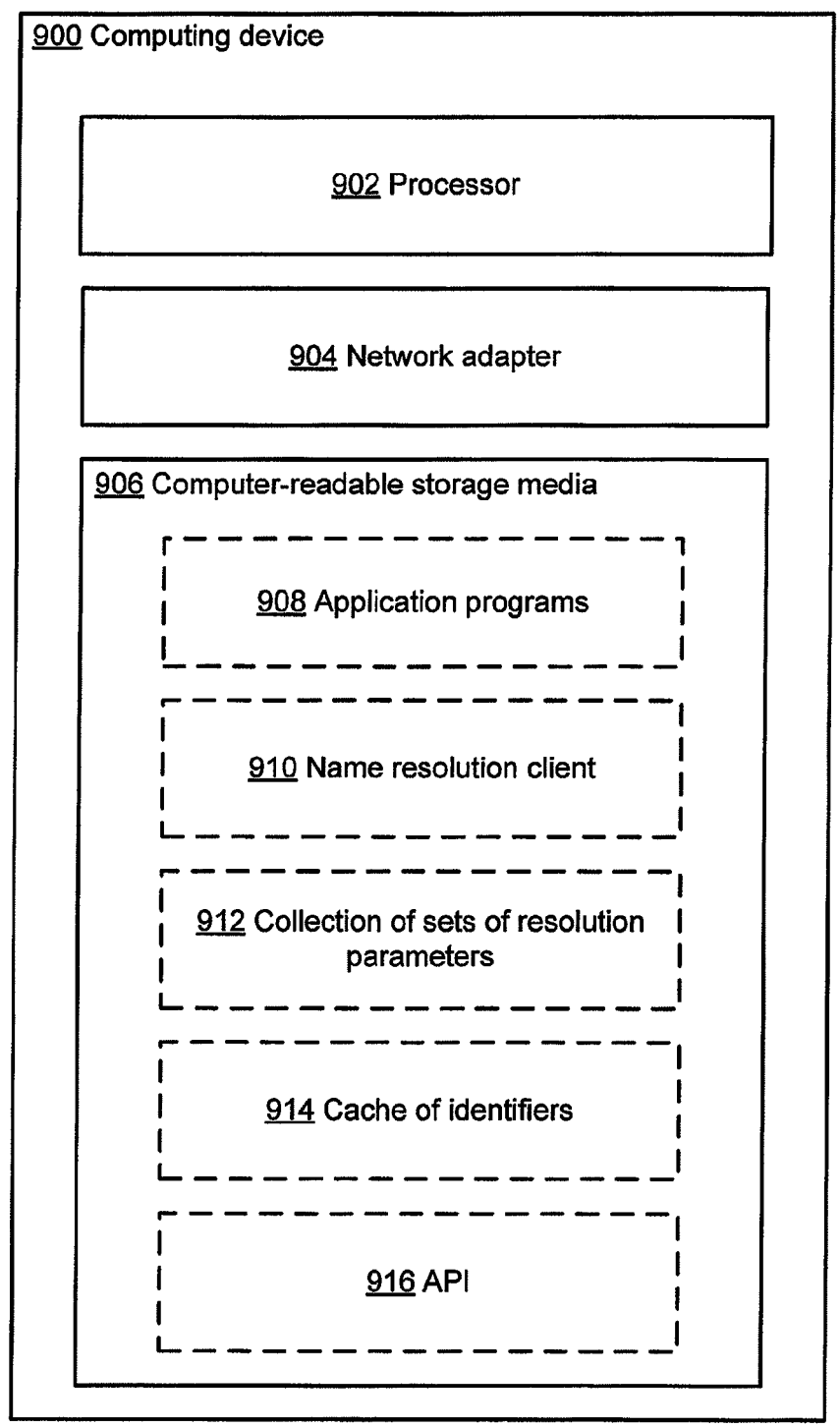
FIG. 9 is a block diagram of components of an exemplary computing device that may implement techniques operating according to some of the principles described herein.

FIG. 9 illustrates one exemplary implementation of a computing device in the form of a computing device 900 that may be used in a system implementing the techniques described herein, although others are possible. Further, it should be appreciated that FIG. 9 is intended neither to be a depiction of necessary components for a computing device to operate in accordance with the principles described herein, nor a comprehensive depiction.

Computing device 900 may comprise a processor 902, a network adapter 904, and computer-readable storage media 906. Computing device 900 may be, for example, a desktop or laptop personal computer, a workstation, a server, a mainframe, a smart phone, or any other suitable computing device. Network adapter 904 may be any suitable hardware and/or software to enable the computing device 900 to communicate with any other suitable computing device over any suitable computing network. The computing network may be any suitable wired and/or wireless communication medium or media for exchanging data between two or more computers, including the Internet. In some implementations, network adapter 904 may be implemented as two or more separate network adapters, offering connectivity via two or more types of network interfaces (e.g., a wired network adapter such as an Ethernet adapter and a wireless network adapter such as an IEEE 802.11g adapter). Computer-readable storage media 906 may be any suitable tangible storage medium adapted to store data to be processed and/or instructions to be executed by processor 902. Processor 902 enables processing of data and execution of instructions. The data and instructions may be stored on the computer-readable storage media 906 and may, for example, enable communication between components of the computing device 900.

The data and instructions stored on computer-readable storage media 906 may comprise computer-executable instructions implementing techniques which operate according to the principles described herein. In the example of FIG. 9, computer-readable storage media 906 stores computer-executable instructions implementing various modules and storing various information as described above. Computer-readable storage media 906 stores data and instructions relating to one or more application programs 908 that may execute on the computing device. These application programs may include those that may accept a first identifier for a network resource and seek to obtain a second identifier for the network resource. The computer-readable storage media 906 also includes a name resolution module 910 for determining a second identifier for a network resource based on a first identifier according to any suitable technique, including any of the exemplary techniques described above. Computer-readable storage media 906 also comprises a collection 912 of sets of resolution parameters. As discussed above, this collection may be organized and formatted in any suitable manner, and the resolution parameters may include any suitable parameters for governing execution of a name resolution process of the name resolution module 910. In one implementation, for example, the collection 912 may be implemented on the computer-readable storage media 906 as a part of a Registry of a Microsoft Windows operating system. Computer-readable storage media 906 may additionally comprise a cache 914 of identifiers that have been retrieved by the name resolution module 910. The cache may be organized in any suitable manner and may contain any suitable type or types of information, including sets of first and second identifiers for network resources, sets of resolution parameters used to obtain identifiers, times that identifiers were obtained, and/or any other type or types of information.

Lastly, in the example of FIG. 9, computer-readable storage media 906 may comprise a set of Application Programming Interface (API) functions to affect the collection of sets of resolution parameters and to determine the contents of the collection. For example, the API may implement a GetProxyInfo function to determine a proxy that may be used for contacting a particular network resource, taking as input an identifier for the network resource. The GetProxyInfo function may use the input identifier for the resource to locate a set or sets of resolution parameters in the collection that apply to the network resource, then may return an identifier for a proxy server if any of the sets of resolution parameters indicate that a proxy server is to be used. A GetPolicyTableInfo API function may also be implemented to return the contents of a collection (i.e., the sets of resolution parameters). Further, a GetEffectivePolicy API function could return some (or all) of the sets of resolution parameters in the collection, depending on which are not applicable to the given situation. For example, if some of the sets of resolution parameters apply to a particular network and the computing device 900 is not connected to that network, then those sets may not be returned as part of the output of the GetEffectivePolicy function. Additionally, a GetAddrInfo or DnsQuery function may be implemented that will take as input a first identifier and execute a name resolution process governed by the collection of sets of resolution parameters to determine a second identifier, and return the second identifier. It should be appreciated that these API functions are merely exemplary of the type of API functions that may be implemented, as embodiments of the invention are not limited in this respect.

Figure 10:
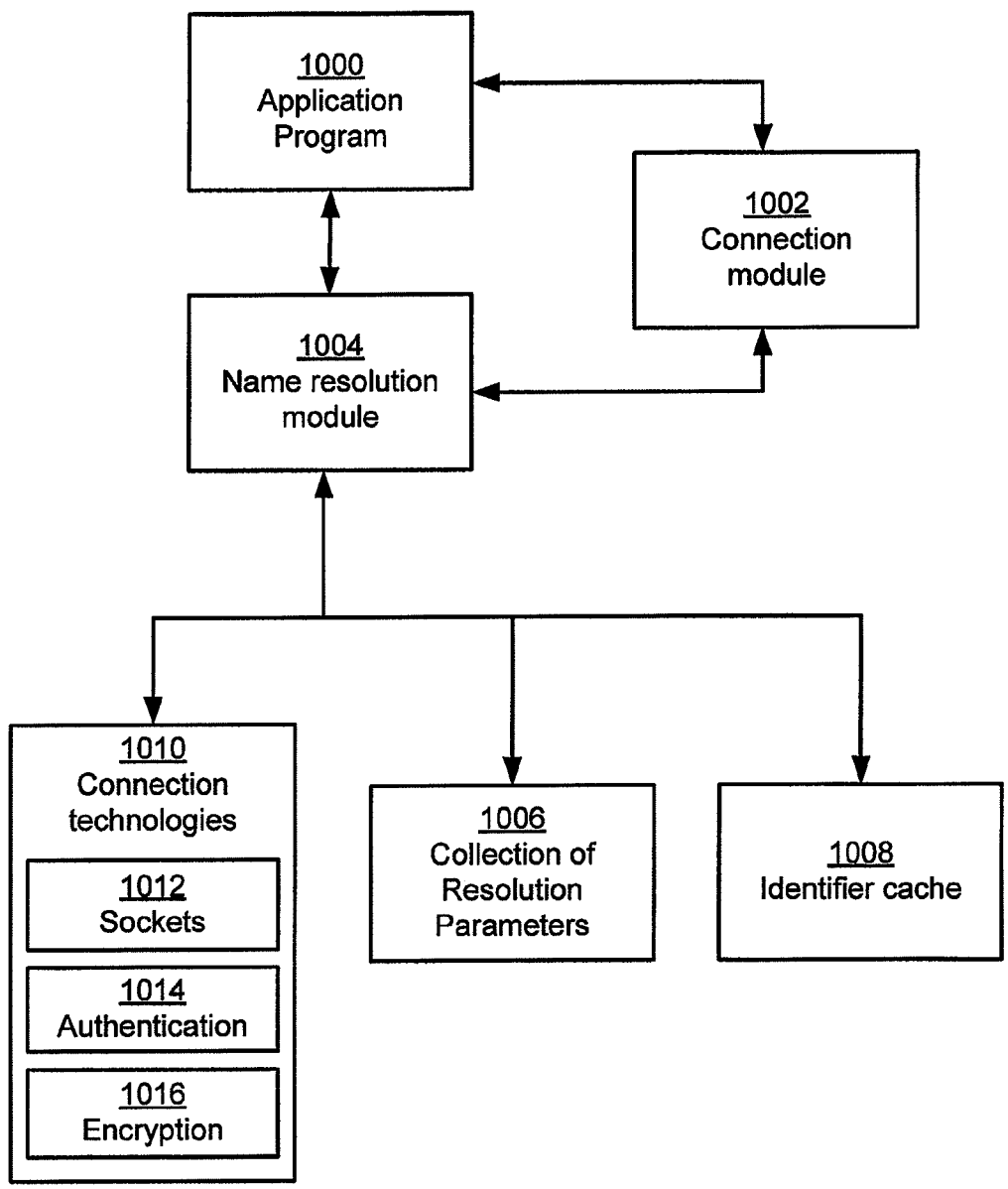
FIG. 10 is a diagram of an exemplary manner of interoperability of modules that may be implemented in accordance with one or more of the techniques operating according to principles described herein.

The modules implementing techniques operating according to the principles described herein may interact in any suitable manner. FIG. 10 shows one exemplary arrangement of modules that may be implemented in accordance with some of the principles described herein.

In the example of FIG. 10, an application program 1000 interacts with one or both of a connection module 1002 and a name resolution module 1004 to determine a second identifier corresponding to a first identifier. For example, the application program 1000 may directly query the name resolution module 1004, or the application program 1000 may attempt to open a connection to a network resource using the connection module 1002 using a first identifier, and the connection module may request a second identifier from the name resolution module to use in opening the connection. The name resolution module 1004, in attempting to obtain a second identifier, may use a collection of sets of resolution parameters 1006 as discussed above, and may further use a cache 1008 of identifiers as discussed above. Lastly, in using the collection of resolution parameters 1006 to obtain a second identifier, the name resolution module 1004 may also use a variety of connection technologies 1010, including a connection module 1012 to open a connection to a resolution resource, and authentication and/or encryption modules 1014 and 1016 to perform any security processes that may be dictated by the resolution parameters in the collection.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A method of resolving a name using a name resolution policy table on a client computer, the method comprising:
    invoking a group policy protocol to access group policy settings on a group policy server;
    retrieving a collection of resolution parameters from the group policy server, the collection of resolution parameters governing communication with a remote computing device;
    parsing the resolution parameters received from the group policy server; and
    saving the resolution parameters locally on the client computer system to populate the name resolution policy table with the collection of resolution parameters.

2. The method of claim 1, further comprising:
    accepting as input a first identifier for a network resource;
    consulting the name resolution policy table to determine a set of applicable resolution parameters that apply to the first identifier; and
    obtaining a second identifier for the network resource from the remote computing device, the obtaining comprising conducting a name resolution process to determine the second identifier for the network resource based on the first identifier, wherein the name resolution process is governed by the set of applicable resolution parameters.

3. The method of claim 2, wherein the obtaining further comprises:
    transmitting to the remote computing device a name resolution request in accordance with the set of applicable resolution parameters.

4. The method of claim 2, wherein the name resolution policy table comprises a plurality of sets of resolution parameters and wherein consulting the name resolution policy table comprises:
    comparing the first identifier of the network resource to patterns associated with each of the sets of resolution parameters to determine whether each set of resolution parameters applies to the first identifier.

5. The method of claim 2, wherein the first identifier is a textual identifier for the network resource and the second identifier is a numeric identifier for the network resource.

6. The method of claim 2, wherein some of the resolution parameters comprise information on one or more types of encryption to be used.

7. The method of claim 2, wherein the resolution parameters comprise identifiers for one or more network resources with which information is to be exchanged during the name resolution process.

8. The method of claim 2, wherein the name resolution process is a process in accordance with global fallback parameters.

9. The method of claim 2, wherein the name resolution process is a process in accordance with global parameters in combination with applicable resolution parameters.

10. The method of claim 2, wherein the name resolution process is adapted to function with an overlay network implemented using Direct Access.

11. A computer-readable storage medium on which is encoded computer-executable instructions that, when executed, cause a computer to perform a method of resolving a name using a name resolution policy table on a client computer, the method comprising:
    invoking a group policy protocol to access group policy settings on a group policy server;

retrieving a collection of resolution parameters from the group policy server, the collection of resolution parameters governing communication with a remote computing device;

parsing the resolution parameters received from the group policy server; and saving the resolution parameters locally on the client computer system to populate the name resolution policy table with the collection of resolution parameters.

12. The computer-readable storage medium of claim 11, wherein the method further comprises:

accepting as input a first identifier for a network resource;

consulting the name resolution policy table to determine a set of applicable resolution parameters that apply to the first identifier; and obtaining a second identifier for the network resource from the remote computing device, the obtaining comprising conducting a name resolution process to determine the second identifier for the network resource based on the first identifier, wherein the name resolution process is governed by the set of applicable resolution parameters.

13. The computer-readable storage memory of claim 12, wherein the obtaining further comprises:

transmitting to the remote computing device a name resolution request in accordance with the set of applicable resolution parameters.

14. The computer-readable storage memory of claim 12, wherein the name resolution policy table comprises a plurality of sets of resolution parameters and wherein consulting the name resolution policy table comprises:

comparing the first identifier of the network resource to patterns associated with each of the sets of resolution parameters to determine whether each set of resolution parameters applies to the first identifier.

15. The computer-readable storage memory of claim 12, wherein the first identifier is a textual identifier for the network resource and the second identifier is a numeric identifier for the network resource.

16. The computer-readable storage memory of claim 12, wherein some of the resolution parameters comprise information on one or more types of encryption to be used.

17. The computer-readable storage memory of claim 12, wherein the resolution parameters comprise identifiers for one or more network resources with which information is to be exchanged during the name resolution process.

18. The computer-readable storage memory of claim 12, wherein the name resolution process is a process in accordance with global fallback parameters.

19. The computer-readable storage memory of claim 12, wherein the name resolution process is a process in accordance with global parameters in combination with applicable resolution parameters.

20. A system comprising:

a processor; and a memory, the memory for storing instructions which, when executed by the processor, performs a method of resolving a name using a name resolution policy table on a client computer, the method comprising:

invoking a group policy protocol to access group policy settings on a group policy server;

retrieving a collection of resolution parameters from the group policy server, the collection of resolution parameters governing communication with a remote computing device;

parsing the resolution parameters received from the group policy server; and saving the resolution parameters locally on the client computer system to populate the name resolution policy table with the collection of resolution parameters.

* * * * *